(No Model.)  3 Sheets—Sheet 1.
M. B. FITTS.
HAY AND STRAW STACKER.
No. 294,981.  Patented Mar. 11, 1884.
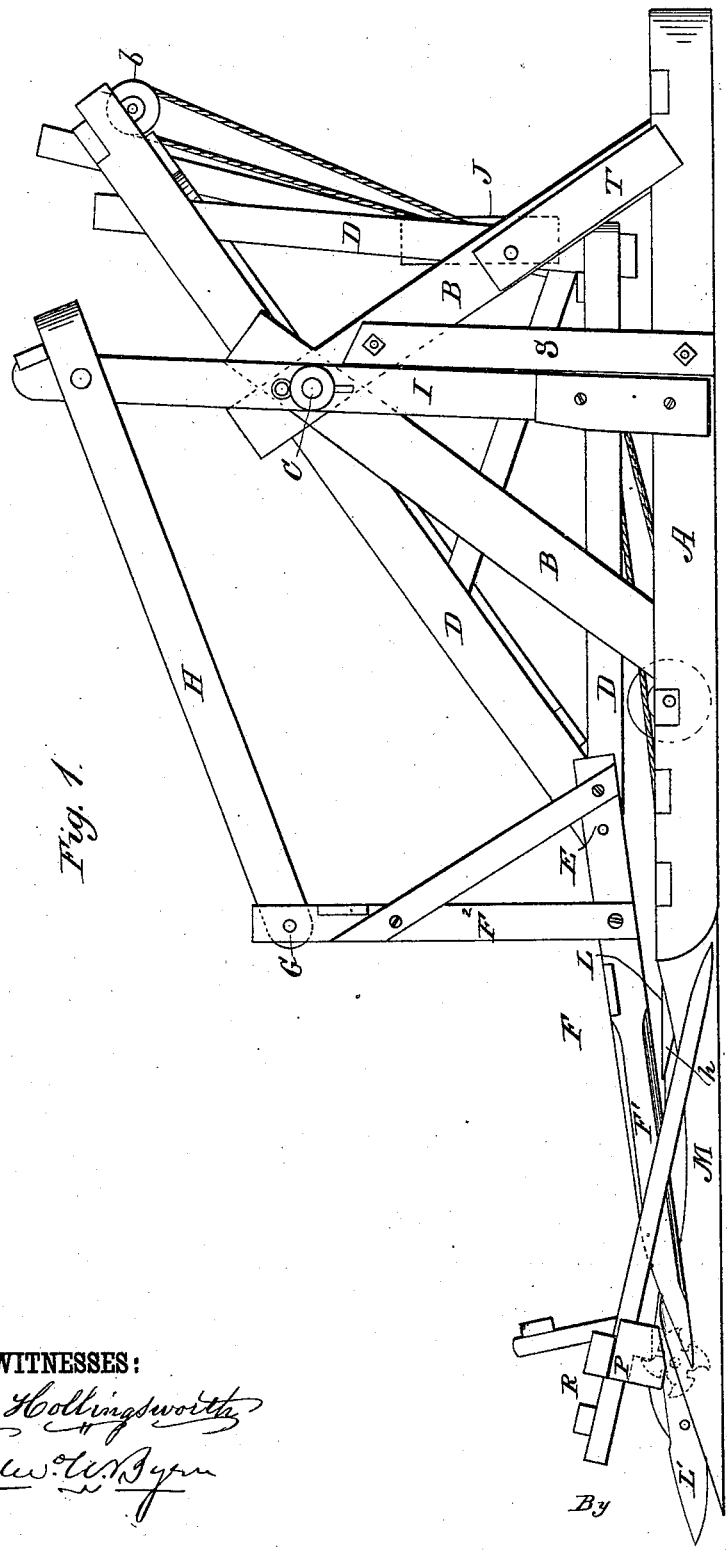
WITNESSES:
W. W. Hollingsworth
Edw. W. Byrn
INVENTOR:
M. B. Fitts
By Munn & Co.
ATTORNEYS.

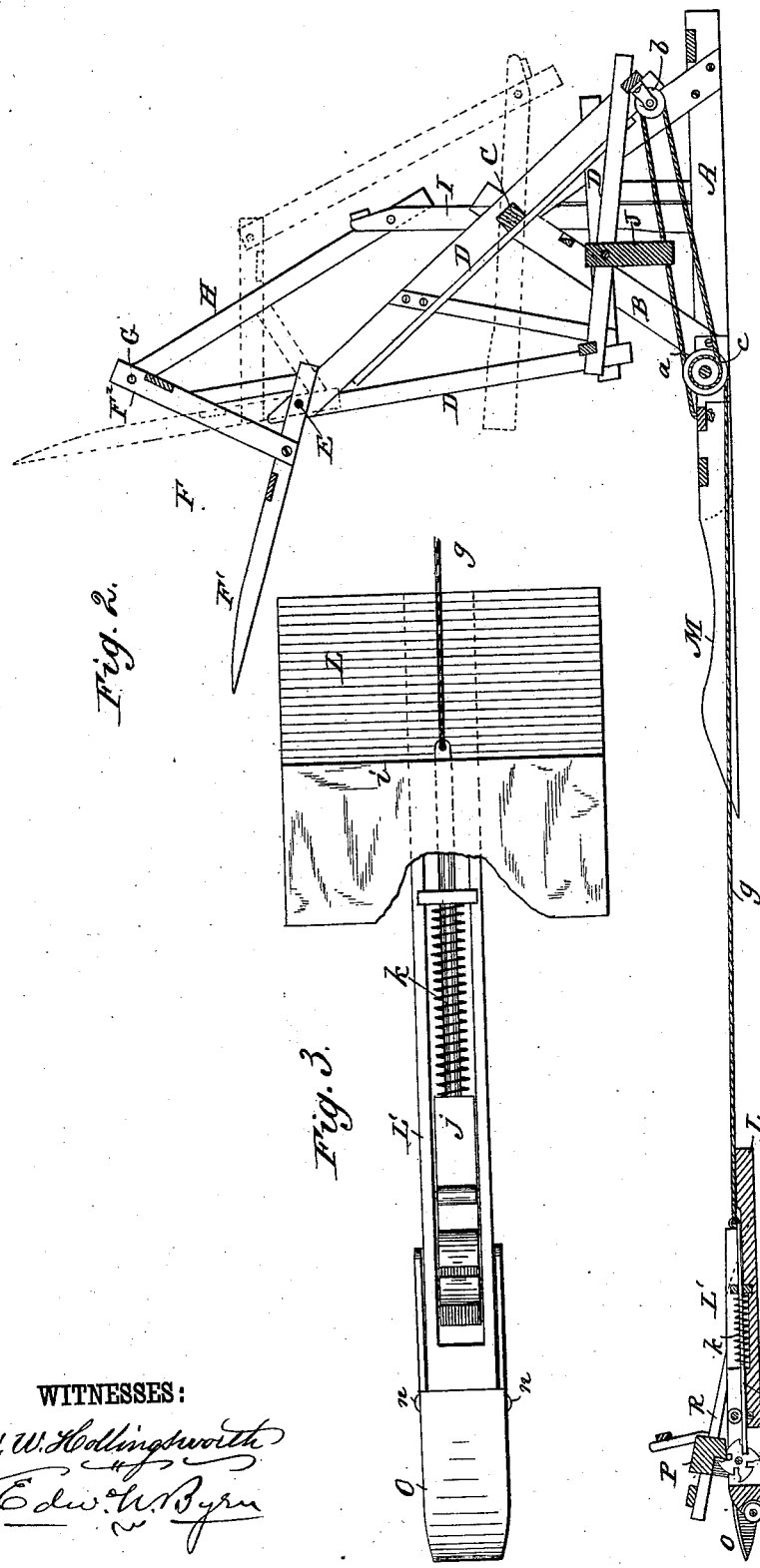

(No Model.) 3 Sheets—Sheet 3.
M. B. FITTS.
HAY AND STRAW STACKER.
No. 294,981. Patented Mar. 11, 1884.
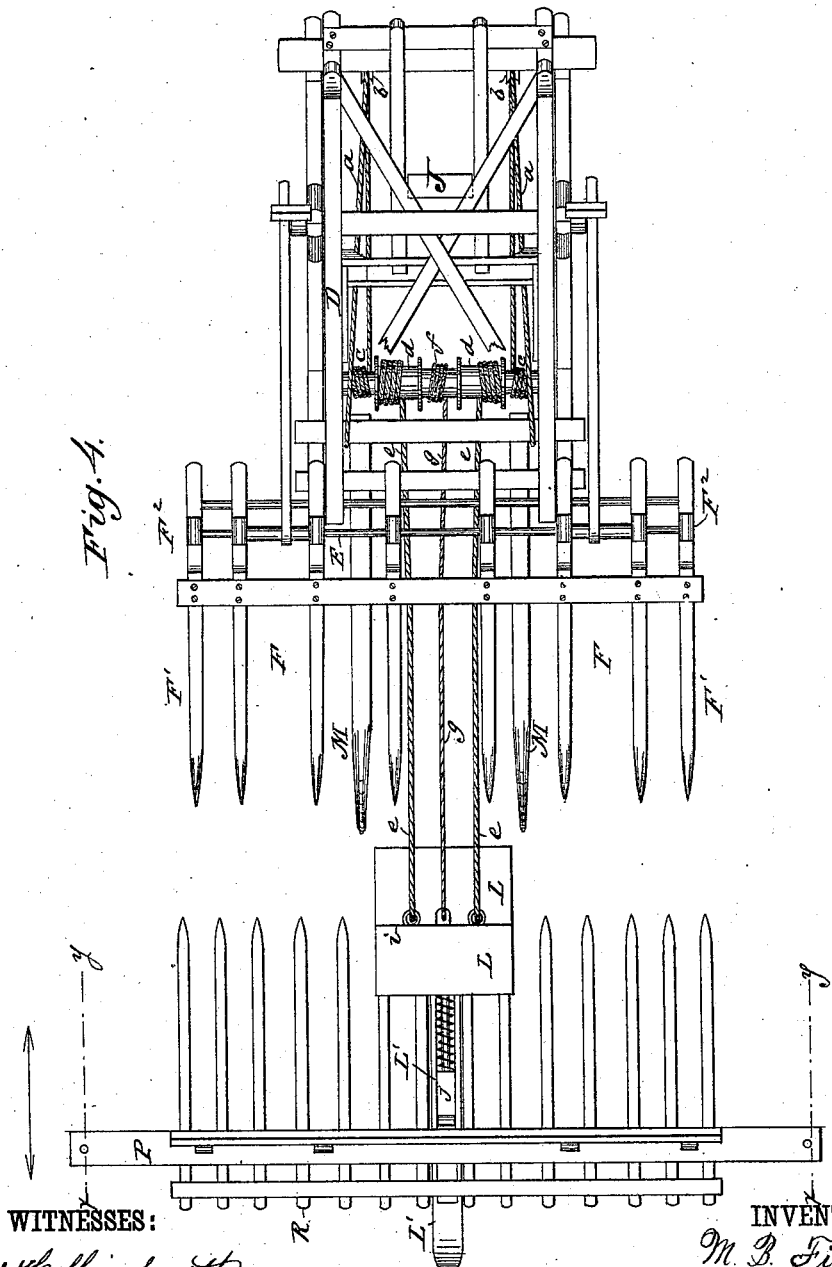
WITNESSES: INVENTOR:
W. W. Hollingsworth M. B. Fitts
Edw. U. Byrn BY Munn & Co
ATTORNEYS.

UNITED STATES PATENT OFFICE.

MORTON B. FITTS, OF GREAT BEND, KANSAS.

HAY AND STRAW STACKER.

SPECIFICATION forming part of Letters Patent No. 294,981, dated March 11, 1884.

Application filed August 23, 1883. (No model.)

*To all whom it may concern:*

Be it known that I, MORTON B. FITTS, of Great Bend, in the county of Barton, State of Kansas, have invented a new and useful Improvement in Hay and Straw Stackers; and I do hereby declare that the following is a full, clear, and exact description of the same, reference being had to the accompanying drawings, forming part of this specification, in which—

Figure 1 is a side elevation of the devices, showing the position of parts when the rake is depositing the load on the hay-receptacle. Fig. 2 is a vertical longitudinal section, showing the hay-stacker raised and about to dump its load. Fig. 3 is an enlarged plan view of the devices shown on the left hand of Fig. 2. Fig. 4 is a plan view of the entire device.

My invention relates to hay and straw stackers for forming hay, straw, &c., into suitable stacks, or for loading it upon wagons; and it consists in the peculiar construction and arrangement of parts, whereby the same horses and rake that bring the hay or straw from the field perform the work of raising the same onto the stack without loss of time, as will be hereinafter fully described, and pointed out in the claims.

In the drawings, A represents the base-frame of the stacker, which rests upon the ground, and is provided upon each side with oblique braces B B, forming an upright triangular frame. At the apices of these frames is fulcrumed, by means of a shaft, C, a right-angled triangular swinging frame, D. At one end of the hypotenuse or long side of this triangular frame is arranged a horizontal shaft, E, upon which is pivoted the right-angled trough-shaped straw-holder F, composed of parallel teeth F' and corresponding bars, $F^2$, projecting from the teeth at right angles, near their pivoted ends. The outer or free ends of these bars are braced or fastened together, and are connected by a pivot-rod, G, to bars H, which on each side are jointed to the tops of normally-vertical levers I, which latter are fulcrumed upon the axial shaft C of the swinging frame D, and are weighted at their lower ends.

To the swinging frame D, on the opposite side of its fulcrum from the straw-holder, is hung a heavy weight, J, which acts primarily as a counter-balance to the straw-holder.

Now, the operation of the parts as so far described is as follows: The straw-holder being at its lowest point, with its teeth resting just above the ground, the swinging frame D is turned (by means hereinafter described) about an arc of ninety degrees, and the teeth of the straw-holder rise in nearly horizontal position until the weight of the straw upon the bars $F^2$ of the straw-holder overbalances it on its shaft E, forcing down the bars H and turning the weighted levers I, as in dotted lines, Fig. 2, which movement throws the straw over upon the stack or wagon. The weighted end of levers I then raises bars H and restores the straw-holder to its normal position on the pivot rod or shaft E, and the straw-holder and frame D turn on the axial center C, and as the straw-holder nears the ground the heavy weight J, in rising upon the opposite side of the fulcrum, counteracts by its gravity the too sudden descent of the straw-holder. Now, for tilting or swinging the frame D, ropes *a* are attached to the front part of the basic frame A and then pass around pulleys *b b* at the back end of the frame D, and thence pass to spools *c c* on windlass K. On this windlass are two other spools, *d d*, just inside of *c c*, around which pass other ropes, *e e*, wound in opposite direction, which extend to and are fastened to the opposite sides of a hitch or tripping device, L L'. Between the spools *d d* on the windlass is a third spool, *f*, around which is wound a trip-cord, *g*, which latter is attached to a locking-bolt of the hitch or trip. This hitch or trip is wider at its rear end, and fits between two horizontal prolongations or guides, M M, from the base-frame A, and its front end, L', is narrow and shaped like a tongue. The under front edge of the wider part L is beveled, as at *h*, Fig. 1, and its upper surface has a shoulder, *i*, Figs. 3 and 4. In the hollow tongue portion L' is a sliding bolt, *j*, to the rear of which is attached cord *g*, and this bolt is normally held forward by a spiral spring, *k*, wound about the same, so that its forward end enters one of the notches, *l*, of the hooked trip-wheel N in the forward end of the tongue L'. The forward end of the tongue L' is mounted upon a roller, *m*, which causes it to move smoothly over the ground, while at this end is also pivoted, at *n*, a nose or hood, *o*, which follows the irregularities of the ground and prevents straw, &c., from passing under the tongue.

Now, in explaining the action of my stacker more fully, I would state that the rake R employed by me is an ordinary two-horse rake, or rake which is drawn across the field by a draft-connection, and a horse at each end. Now, the trip or hitch L L' being close to the stacking devices and resting between the two guides M M, and the straw-holder having its teeth resting near the ground, as shown in Fig. 1, the rake R, having collected a load of hay or straw, is dragged by the horses up to the straw-holder, the horses being attached at y y, Fig. 4, and passing upon opposite sides of the receptacle F. The rake-teeth then pass between the teeth of the straw-holder, transferring the load thereto, and two of the rake-teeth pass under the beveled edges h of the hitch or trip L L', and at the same time the bar P of the rake passes behind one of the hooks of the trip-wheel N, as in Fig. 1. The horses are then turned to the point x, Fig. 4, and draw the rake back, and as it moves backward it finds a bearing against the trip-wheel N and pulls along with it the hitch or trip L L', the latter passing out from the guides M M until a tension is put on ropes e e. The latter then commence to rotate the windlass, and by winding up the ropes a a raise the straw-holder and dump it, as hereinbefore described. Then, as the hitch or trip L L' is drawn a little farther the cord g becomes tense, and this pulling on the spring-bolt j releases the trip-wheel N and allows it to turn and the rake-bar P to pass over the same to get a new load. The weight of the straw-holder then, in descending, draws back the ropes a a, rotating the windlass in the opposite direction, which has the effect to wind up ropes e and g on their respective spools and to pull the hitch or trip L L' back between the guides M again.

S is a cleat or stop-bar fixed to the stationary frame to limit the back movement of the weighted levers, and T are other stops to prevent the straw-holder from having the full movement for dumping its load, which load is not to be dumped when topping off the stack, but is taken out of the holder at the pleasure of the workman on the stack. A wire or cord may be attached to the middle of the front end of the frame and pass through loops in the lower side of the trip-block. The wheel in the front-end tongue of this block is grooved, and allows it to run smoothly to a point a short distance beyond the limit to which the block passes, where the wire is fixed to a stake driven into the ground, bringing the wire to a level with the surface of the ground at the point of attachment to the stake, the object of the wire being for a guide to the block, and to insure its passing back to exactly its proper position when it returns, the intention being that the wire shall lie on the ground and offer no obstruction to the approach of the rake. This wire may be used as an alternative device in the place of guides M, or it may be used in conjunction with the same.

Having thus described my invention, what I claim as new is—

1. A straw or hay stacker consisting of a stationary base-frame, a swinging frame supported therein, a rocking straw-holder, F, carried upon the end of the swinging frame, the bars H, and the weighted levers I, all combined substantially as shown and described.

2. The combination, with the stationary base-frame and the swinging frame D, carrying the straw-holder at its end, of a counter-weight arranged upon the opposite side of the fulcrum from the straw-holder, and arranged, as described, to rise when the straw-holder falls, as set forth.

3. The combination, with the straw holding and elevating devices, of a windlass, a hitch or trip device, and a separable rake, the said windlass being connected to the tripping devices and the elevating devices, as described, and the rake adapted to connect with the tripping device to elevate the straw-holder, and then be disconnected therefrom, as described, whereby the single team of horses is made to gather and stack the straw and hay.

4. The combination, with a windlass and the stacker-frame, of the spring hitch or trip L L', ropes connecting the same to the windlass, the trip-wheel N, and a rope connecting the locking-bolt of the trip to the windlass, substantially as shown and described.

5. The combination, with the straw-elevating devices and the windlass for working them, of the rigid guides M M, and the adjustable hitch or trip L L', as and for the purpose described.

6. The adjustable hitch or trip L L', having a pivoted hood or nose, in combination with a separable rake adapted to ride upon the same, as described.

MORTON B. FITTS.

Witnesses:
CHARLES E. CASTLE,
G. W. NIMOCKS.